Dec. 15, 1970   P. J. BRUHA   3,546,935
FLUID MEASUREMENT SYSTEM AND METHOD
Original Filed Nov. 25, 1966   6 Sheets-Sheet 1

WITNESSES
*Leon M. Garman*
*Robert C. Baird*

INVENTOR
Peter J. Bruha

BY *Leon Schron*
ATTORNEY

Dec. 15, 1970  P. J. BRUHA  3,546,935
FLUID MEASUREMENT SYSTEM AND METHOD
Original Filed Nov. 25, 1966  6 Sheets-Sheet 5

United States Patent Office 3,546,935
Patented Dec. 15, 1970

1

3,546,935
FLUID MEASUREMENT SYSTEM AND METHOD
Peter Joseph Bruha, Severna Park, Md., assignor to Westinghouse Electric Corporation, Pittsburgh, Pa., a corporation of Pennsylvania
Continuation of application Ser. No. 596,847, Nov. 25, 1966. This application Nov. 24, 1969, Ser. No. 872,460
Int. Cl. G01p 5/00
U.S. Cl. 73—194                                      13 Claims

ABSTRACT OF THE DISCLOSURE

Upstream and downstream transducers travel along the well portions of a fluid conveying conduit and transmit acoustic energy towards one another, through the fluid, in repetitive transmission cycles, during the course of travel along the wall portions. Circuitry is provided which obtains an indication of the difference in travel times of the upstream and downstream acoustic energy, the difference in travel time $\Delta T$ being proportional to $LV$ where $L$ is the distance between the transducers and $V$ the component of fluid velocity along the acoustic path between the transducers. For each transmission cycle an $LV$ value is obtained and the values are accumulated whereby fluid discharge rate, total flow, and other related readings may be obtained. The circuitry utilized includes means for correcting for the speed of sound in the fluid under measurement and an embodiment of the invention includes circuitry whereby the average velocity of the fluid in an irregularly shaped channel may be obtained.

This application is a continuation of now abandoned Ser. No. 596,847, filed Nov. 25, 1966.

This invention in general relates to fluid flow measurement and particularly to a method and apparatus for accurately obtaining discharge rates, total flow, and other related measurements.

A variety of fluid flow meters utilize acoustic energy for determining fluid velocity. In such systems, acoustic energy is propagated to an upstream transducer receiver means and to a downstream transducer receiver means and the difference in travel time from the acoustic transmitter to the respective receivers, of the oppositely directed signals is measured. Since the upstream signal is retarded by the velocity of the fluid and the downstream signal is aided by the velocity of fluid, the travel times of the acoustic signal may be expressed as:

$$T_U = \frac{L_U}{C - V}$$

and $$T_D = \frac{L_D}{C + V}$$

where $T_U$ and $T_D$ are the transit times upstream and downstream respectively, $L_U$ is the distance between the acoustic transmitter and the upstream transducer receiver, $L_D$ is the distance between the acoustic transmitter and the downstream transducer receiver, $C$ is the speed of sound in the fluid under measurement and $V$ is the velocity component of the fluid along the line joining the transmitter and receiver. To eliminate possible inaccuracies, in many systems the upstream and downstream transducers act in the dual capacity of transmitting transducer and receiving transducer and in such case the path lengths $L_U$ and $L_D$ are equal, and the difference in transit times or times of arrival of the upstream and downstream signals is $$T_D - T_U = \Delta T = \frac{2LV}{C^2 - V^2}$$

2

Since $C^2$ is much larger than $V^2$, the equation may reduce to $$\Delta T = \frac{2LV}{C^2}$$

With a known $C$ and a known $L$, the velocity of the fluid therefore is proportional to the difference in transit times $\Delta T$ which in turn may be determined for example by phase or frequency difference, or digital techniques. In many instances, it is desired to know more than the velocity of the fluid and it becomes necessary to convert the velocity readings to discharge rates, to volume or mass flow, or to other related readings.

Since the acoustic signals are transmitted through the fluid between two fixed points, only the fluid velocity having a component along the line joining those two points is, in actuality, measured. A conversion factor to obtain discharge rate therefore would only be valid if the velocity of the fluid within the fluid conveying conduit was uniform over the entire cross-section of the conduit. If the fluid velocities over a cross-sectional area of the conduit vary, there is a strong probability that the discharge rate or related readings will be in error.

It is, therefore, one object of the present invention to provide an improved fluid measuring system for accurately measuring discharge rate of a fluid within a fluid conveying conduit.

Another object is to provide an improved system for accurately measuring total discharge.

A further object is to provide an improved system which is capable of accurately measuring average velocity of the fluid within a conduit.

In order to compute discharge rate, it is necessary to know the cross-section of the fluid conveying conduit since $Q$, the discharge rate is equal to $AV$, where $A$ is the cross-sectional area and $V$ is the velocity of fluid through that cross-sectional area. For rectangular conduits, if a series of velocity readings are obtained throughout the height of the conduit, the velocity readings may be multiplied by known incremental areas to eventually obtain discharge rate. For the case of a non-rectangular cross-section, no existing system gives an accurate output reading directly proportional to volume or discharge rate.

It is, therefore, another object of the present invention to provide an improved fluid measuring system for non-rectangular fluid conveying conduits.

One type of fluid velocity measuring system utilizes two fixed dual capacity transducers and incorporates digital methods wherein a variable frequency oscillator provides a time interval counter with pulses to be counted for time intervals commencing with the first received acoustic signal downstream and ending with the second received acoustic signal upstream; the count in the time interval timer is then dependent upon $\Delta T$ and is indicative of the fluid velocity. Since the speed of sound $C$ may vary with the mineral content and temperature of the fluid being measured, means are generally provided to compensate the system for varying speeds of sound. This type of system, however, may not have the capabilities for obtaining an indication of discharge rate or related readings to an exacting degree of accuracy, especially in non-rectangular cross-sectional conduits.

Another object of the invention, therefore, is to provide an accurate fluid measurement system for irregularly shaped conduits utilizing a variable frequency oscillator and digital measuring methods and wherein compensation is made for varying speeds of sound.

It is another object to provide an improved method of fluid measurement, particularly for irregularly shaped fluid conveying conduits.

Briefly, in accordance with the above objects, the broad concept of the invention comprises the propagation of acoustic energy through a fluid under measurement, toward first and second transducer receiver means located upstream and downstream of fluid flow. Preferably, although not limited thereto, the upstream and downstream transducers act in the dual capacity of alternately transmitting acoustic energy to, and then receiving acoustic energy from, the opposed transducer. Circuit means are provided for deriving a value dependent upon the difference in time arrival $\Delta T$, of the acoustic energy at the respective transducers, the value being indicative of LV where L is the distance between the transducers and V is the fluid velocity component along the acoustic path. The transducers are then moved along first and second respective paths, preferably at a constant rate during which time acoustic transmissions and derivations of associated values take place. An indication of the summation of the values derived during the course of travel of the transducers is obtained and by knowing the total number of transmissions or readings obtained during a traverse, and knowing the time required to make the traverse, an output is obtained which is related to fluid discharge rate Q. By modification, other readings such as total flow, may be obtained.

The objects and the basic concept are accomplished in the present invention, one illustrative embodiment of which comprises a digital measuring system wherein upstream and downstream transducers for transmitting acoustic pulses to, and receiving acoustic pulses from, one another during repetitive acoustic transmission cycles, are arranged to travel at a known rate along first and second track means associated with wall portions of a fluid conveying conduit. The tracks are preferably arranged such that the acoustic path between transducers is at a constant angle with respect to fluid flow during the entire path travel.

In accordance with a known prior art technique, a variable frequency oscillator (VFO) is used in conjunction with a digital counter which counts up, in a transmission cycle, the VFO output for a time period $\Delta T$ corresponding to the difference in transit times of the acoustic pulses provided and received by the upstream and downstream transducers. The count in the digital counter therefore is dependent upon $\Delta T$ and is an indication of the product of the distance L separating the transducers and, fluid velocity V. Since during a periodic transmission cycle a count or value is derived which is indicative of LV, by accumulating or summing the values so derived, and in conjunction with known traverse rates and known transmission rates, an indication of discharge rate may be obtained.

Since the velocity of sound C may vary in the fluid with varying mineral content or temperature, there is provided an auxiliary acoustic system utilizing two transducers at a known and fixed distance apart for not only obtaining an indication of fluid velocity but also for correcting the frequency of the VFO to compensate for variations in the speed of sound in the fluid. In another embodiment of the invention, circuitry is provided for obtaining an indication of average fluid velocity within an irregularly shaped conduit.

The above stated as well as further objects and advantages of the present invention will become apparent upon a reading of the following detailed specification taken in conjunction with the drawings, in which:

Figure 1:
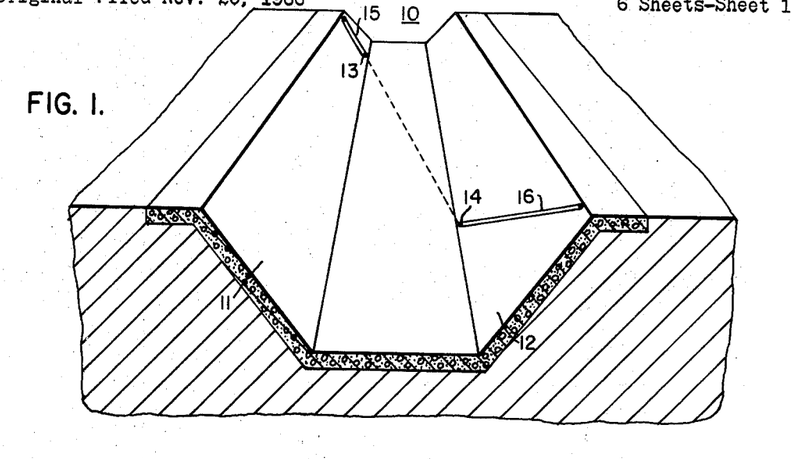
FIG. 1 is a perspective view, partially, in section, of a fluid conveying conduit which is non-rectangular in cross-section.

Referring now to FIG. 1, there is illustrated a fluid conveying conduit 10 in the form of an open canal having sloping side walls 11 and 12 forming with the bottom of the canal a trapezoidal cross-section. Transducers 13 and 14 (illustrated as points) are located upstream and downstream of fluid flow and are movable in tracks 15 and 16 operatively associated with walls 11 and 12 respectively. The canal of FIG. 1, illustrative of one type of water supply means for urban and suburban communities, may have a height of between 20 and 30 feet with the distance between transducers 13 and 14 being in the order of several hundred feet.

Figure 2:
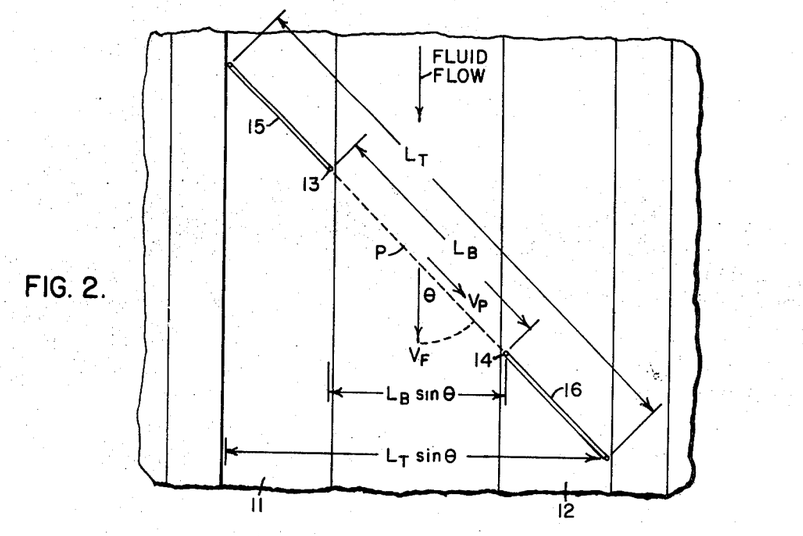
FIG. 2 is a plan view of the conduit of FIG. 1 and further serves to illustrate certain path lengths, angles and orientations.

FIG. 2 illustrates a plan view of the canal of FIG. 1 and although not limited to the arrangement shown, it is preferable that the orientation of the transducer conveying tracks 15 and 16 be such that the acoustic beam path, represented by the dotted line P, remain at a constant angle $\theta$ with respect to the fluid flow direction during the course of travel of the transducers from their lower limits to their upper limits.

FIG. 2 also serves to define various equation terms which will be developed herein. At the lower limit of travel, the distance between transducers 13 and 14 is designated $L_B$, and at the upper limit of travel the distance between the transducers is $L_T$. Basic geometry reveals that the distance across the channel at the point where the transducers are in their lower limit is $L_B$ sine $\theta$, and when in their upper limit is $L_T$ sine $\theta$. The fluid velocity is designated by the vector $V_F$ and the measured component of fluid velocity is designated $V_P$ which, from vector and geometry considerations, is equal to $V_F \cos \theta$.

For obtaining discharge rate Q, it is necessary to know cross-sectional area (A) and the velocity (V) of fluid passing through the area A, that is:

$$Q = AV$$

An incremental discharge rate may be expressed as:

$$dQ = dA \times V_F$$

where $dA$ is an incremental area and $V_F$ is the average fluid velocity in $dA$.

Figure 2A:
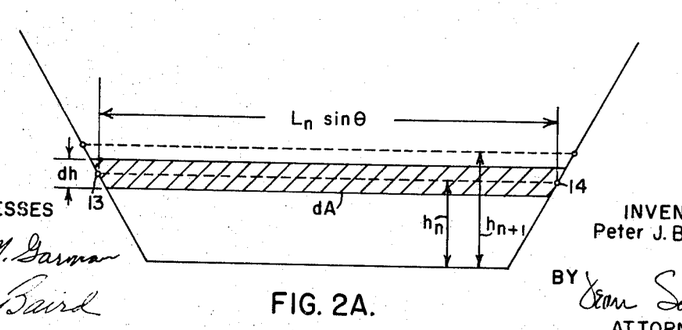
FIG. 2A is an enlarged end view profile of the conduit of FIG. 1 serving to define certain terms.

FIG. 2A illustrates a cross-sectional profile of the canal under consideration and serves to define several terms. As was stated, during a traverse along the tracks of transducers 13 and 14 (the tracks 15 and 16 are not illustrated in FIG. 2A), acoustic transmissions periodically take place for obtaining values related to LV. The position in FIG. 2A of transducers 13 and 14 at a height $h_n$ above a reference, represents a point in the traverse at which an acoustic transmission takes place. The distance between the transducers is $L_n$. An elemental area $dA$ is shown shaded and is equal to length times height, that is, to a good approximation $dA = L_n$ sine $\theta \times dh$. The incremental height $dh$ is equal to the vertical distance between transducer positions from one acoustic transmission to the next acoustic transmission. In FIG. 2A if an acoustic transmission takes place when the transducers are at a height $h_n$ above a reference and the next transmission takes place when the transducers are at a height of $h_{n+1}$, $dh$ would then equal $(h_{n+1}) - (h_n)$. With the rate of movement of the transducers in their respective tracks being known, and with the acoustic transmission rate being known, the height $dh$ is known, for example, $\frac{1}{100}$ of a foot depending upon canal widths and traverse rates utilized. The incremental discharge $dQ$ through the incremental area $dA$ therefore is equal to:

$$dQ = dA \times V_F = L_n \sin\theta \times dh \times V_F$$

From FIG. 2:

$$V_F = \frac{V_P}{\cos\theta}$$

therefore:

$$dQ = L_n \sin\theta \times dh \times \frac{V_P}{\cos\theta}$$

which reduces to:

$$dQ = [dh \tan\theta] L_n V_P \qquad (1)$$

In the present invention, each acoustic transmission results in a value indicative of $L_n V_P$. Since the angle $\theta$ is known, the tangent of $\theta$ is then known, and since $dh$ is known, the term in the brackets of Equation 1 is a known constant value.

Movement of the tranducers 13 and 14 along their respective tracks, with successive acoustic transmissions and derivation of LV indicative values is the equivalent of integrating Equation 1, that is, total $$Q = \int_B^T dQ \qquad (2)$$

and is directly obtained by accumulating, that is summing, all the values derived and modifying the result by the aforementioned constant value (or modifying each value derived and then summing). If the paths of the transducers 13 and 14 are not in the direction as illustrated in FIG. 2, then the angle $\theta$ may constantly change as the transducers move up the tracks. In such instance, the tangent $\theta$ term of Equation 1 must be modified to accommodate for the varying angle $\theta$.

Figure 3:
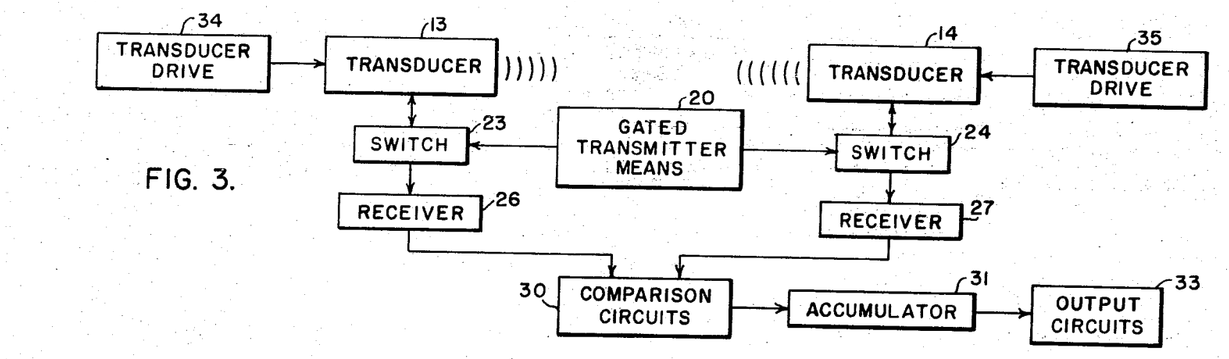
FIG. 3 illustrates a block diagram of a basic fluid measurement system for use in a fluid conveying conduit such as illustrated in FIG. 1.

FIG. 3 is illustrative of one type of component arrangement which may be utilized in the obtaining of various fluid measurements. In FIG. 3, there is provided gated transmitter means 20 which supplies a pulse of electrical energy during periodic transmission cycles, through switches 23 and 24 to upstream and downstream transducers 13 and 14. Upon receipt of the respective acoustic signals transmitted through the fluid, transducers 13 and 14 will produce corresponding output signals which are passed through switches 23 and 24 to receivers 26 and 27. The difference in time occurrence of the signals provided by receivers 26 and 27 is determined in comparison circuits 30.

Means for performing a summation of the values derived during the periodic transmission cycles takes the form of an accumulator 31 the results of which are fed to output circuits 33 for providing a meaningful output indication or reading for control purposes, computer use or visual inspection for example.

Transducer drive means 34 and 35 are provided in order to respectively move transducers 13 and 14 along their predetermined paths. It has been stated that it is preferable that the transducer drive means move the transducers at a predetermined constant rate. In situations where the rate may be varying, a modifying value must be utilized in the final determination of discharge, etc.

A feature of the present invention is the provision of a digital measuring system utilizing a variable frequency oscillator (VFO) wherein periodic correction of the VFO frequency is made by an auxiliary acoustic circuit and wherein the VFO is common to both the measuring and auxiliary circuits. Such an arrangement is illustrated in block diagram form in FIG. 4.

Figure 4:
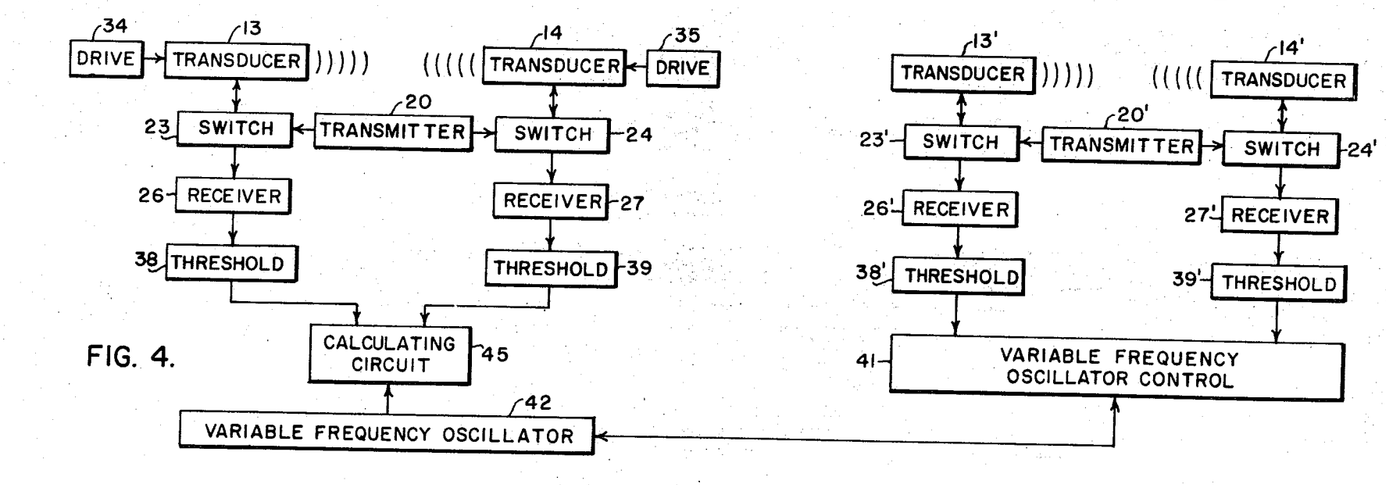
FIG. 4 illustrates in block diagram form an embodiment of the invention wherein correction is made for varying speeds of sound in the fluid under measurement.

The system for the movable transducers is similar to that shown in FIG. 3 and like components have been given like reference numerals. Since a system is described which is digital in nature threshold circuits 38 and 39 are included in order to provide a sharply defined pulse in response to the output of receivers 26 and 27 respectively. The auxiliary circuit includes fixed transducers 13' and 14' together with components similar to that of the moving system and counterparts are designated by primed reference numerals. The pulses provided by threshold circuits 38' and 39' of the auxiliary circuit are fed to a VFO control and associated circuit 41 which is operable to vary the frequency of the VFO 42 in accordance with varying speed of sound in the fluid under measurement. The variable frequency oscillator 42 is used not only in the auxiliary circuit but is also fed to the block designated calculating circuitry 45 which in conjunction with the pulses received from threshold devices 38 and 39 is operable to derive a value indicative of LV for each transmission, accumulate the values derived during the course of a traverse of the transducers, and modify the summation for providing meaningful output signals.

Figure 5:
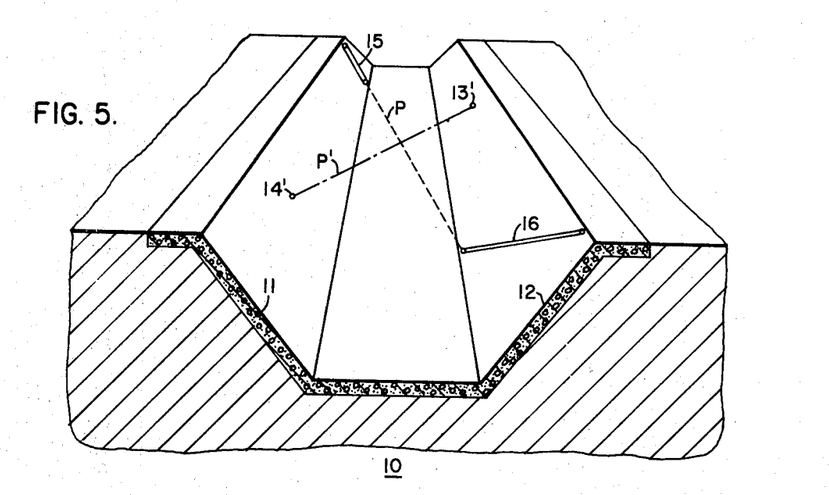
FIGS. 5 and 6 are views as in FIGS. 1 and 2 and further show transducer orientations in accordance with an embodiment of the invention.
Figure 6:
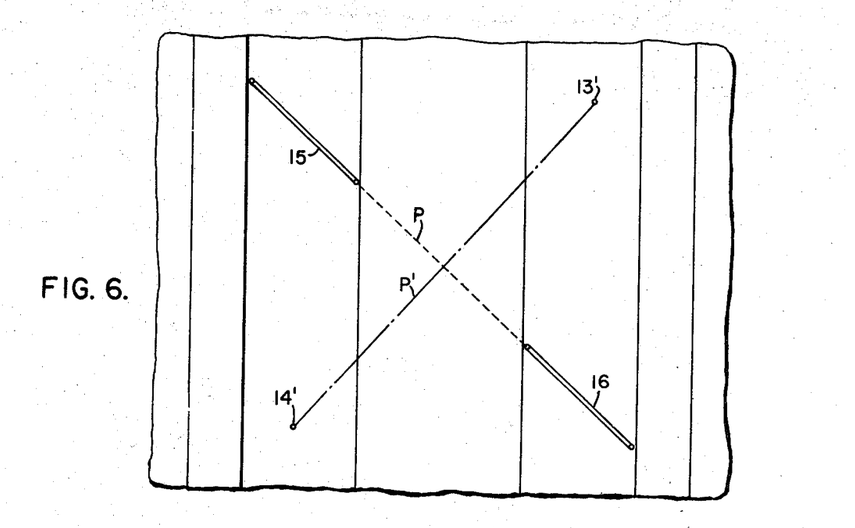

One preferred orientation or placement of transducers 13' and 14' is illustrated in FIGS. 5 and 6. Basically, in order to eliminate complex gating circuits and time sharing techniques, the fixed transducers 13' and 14' define an acoustic path P' which is substantially at right angles to the acoustic path P of the moving transducers. In this manner, there is no chance for interference between the acoustic paths.

Figure 7:
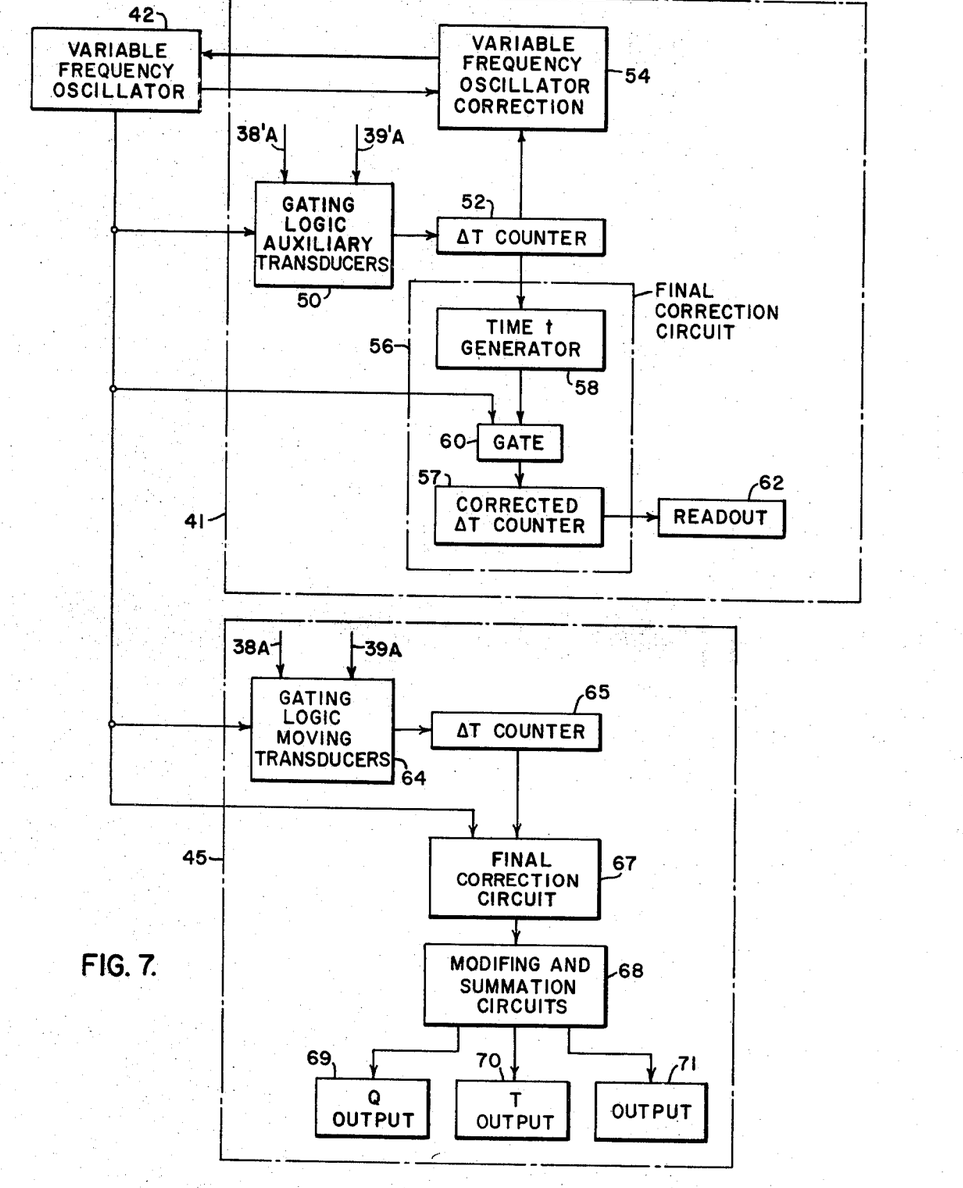
FIG. 7 illustrates in block diagram form a portion of the circuit of FIG. 4 in more detail.

The VFO control and associated circuitry 41 and the calculating circuitry 45 are shown in somewhat more detail in FIG. 7 to which reference is now made.

The gating logic 50 functions to gate the VFO 42 output to the $\Delta T$ counter for a time period commencing with the first received pulse and ending with the second received pulse on input leads 38'A and 39'A from threshold devices 38' and 39' (FIG. 4), respectively. An indication of the count in the $\Delta T$ counter 52 is provided to the VFO correction circuit 54 which is then operable to vary the output frequency of the VFO 42 in accordance with variations in the speed of sound in the fluid. One type of VFO correction arrangement forms the subject matter of copending application Ser. No. 590,618, filed Oct. 31, 1966, and assigned to the assignee of the present invention. In the absence of a VFO correction circuit, the count in the $\Delta T$ counter would have an error which is a function of $C^2$. The provision of the correction circuit reduces the error so that it is a function of $C$. In order to eliminate this residual error, further compensating means may be provided.

One such type of further compensating means is illustrated as the final correction circuit 56 and forms the subject matter of copending application Ser. No. 569,996, filed Aug. 3, 1966, and assigned to the assignee of the present invention. Basically, the final correction circuit 56 includes a corrected $\Delta T$ counter 57, means responsive to the count in the $\Delta T$ counter 52 for generating a time interval $t$, as indicated by the time $t$ generator 58 and a gating means 60 for gating the output of the VFO 42 to the corrected $\Delta T$ counter 57 for the aforementioned time interval $t$. By reference to the aforementioned copending application 569,996, it may be demonstrated that the count in the corrected $\Delta T$ counter is totally independent of the speed of sound $C$ and is proportional to LV. Since L is known and is the fixed distance between the fixed transducers, the count in the corrected $\Delta T$ counter 57 is indicative of fluid velocity at that particular height in the fluid at which the fixed transducers are located. If an indication of this velocity is desired, an output means such as readout means 62 may be provided.

In a somewhat similar fashion, the calculating circuitry 45 includes gating logic 64 which gates the output of the VFO 42 to the $\Delta T$ counter 65 for a time period $\Delta T$ corresponding to the first and second received pulses on input leads 38A and 39A from threshold devices 38 and 39 (FIG. 4), respectively. For each acoustic transmission cycle wherein the VFO output is gated into the $\Delta T$ counter 65, the ΔT counter will have a count which is dependent upon ΔT and indicative of LV. For the case of the moving transducers, the actual L term for each transmission may be different; however, for the solution of Equation 1, it is only necessary to obtain the product of L and V. Since the VFO 42 is initially corrected by the VFO control circuit 41, the count in the ΔT counter 65 may include an error which is proportional to C. In order to eliminate this residual error, a final correction circuit 67 is provided. The final correction circuit 67 receives as an input signal an indication of the count in the ΔT counter 65, and the output signal provided by the final correction circuit 67 is therefore dependent upon ΔT and is also indicative of the product LV and is totally independent of the speed of sound C.

Modifying and summation circuits 68 are provided and are responsive to the values provided by the final correction circuit 67 during the repetitive transmission cycles to integrate, that is perform a summation of the values so received.

The final correction circuit may function to gate the VFO 42 output through to the modifying and summation circuits for an artificially generated time interval $t$ ($t$ representing a desired time interval in general and not necessarily equal to the $t$ interval associated with generator 58). By manipulation of the means for generating the time interval $t$, the count provided by the final correction circuit in response to the VFO output may have a "built-in" multiplication or scaling factor. For example, it will be remembered that $$dQ = [dh \tan \theta] L_n V_P$$

Since the count provided by the final correction circuit 67 is related to $L_n V_P$ by a proportionality constant by suitable choice of time interval $t$, the proportionality constant may, in effect, be chosen to incorporate the $ah \tan \theta$ term so that the count provided equals $dQ$. By summing the counts provided during each transmission cycle, total Q is obtained.

The modifying portion of the circuits 68 may be division circuits for suitable scaling to provide output readings in desired units. After the modification and summation of the values or counts from the final correction circuit 67, a discharge reading may be provided by the Q output circuit 69. By suitable scaling, this reading may be provided in units such as cubic feet per minute, liters per minute, gallons per hour, etc.

With a knowledge of the total elapsed time over which the discharge rate reading is obtained, a reading indicative of total flow may be provided by the T output circuit 70. By suitable scaling, this reading may be directly in cubic feet, gallons, acre-feet, to name a few. An output circuit 71 is indicated for the provision of other related fluid measurements which may be obtainable once an indication of the product LV is known.

In essence, the calculating circuitry 45 obtains a value which is dependent upon ΔT and which is proportional to LV. Once this value has been obtained, it is obvious to one skilled in the art, that the values may be first summed and then modified, first modified and then the modifications summed, or a combination of the two, as performed in FIG. 7.

Figure 8:
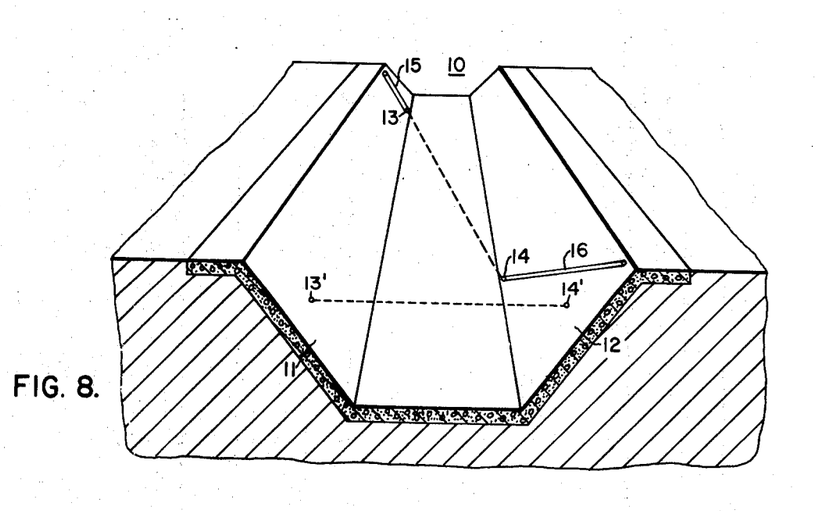
FIGS. 8 and 9 are view as in FIGS. 1 and 2 illustrating another transducer orientation.
Figure 9:
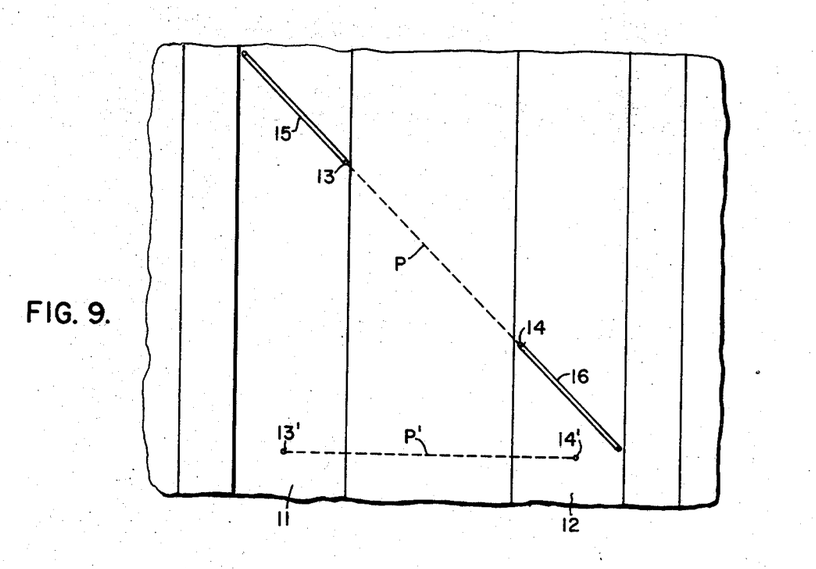

As was stated, a primary purpose for the auxiliary transducer circuit is for the correction of the VFO frequency for variations in the speed of sound in the fluid under measurement. FIGS. 8 and 9 illustrate an arrangement of auxiliary transducers 13' and 14' oriented such that the acoustic beam path between the transducers is at right angles to the fluid flow and in this manner several electronic components may be eliminated since the velocity component along the acoustic path is known to be zero.

Figure 10:
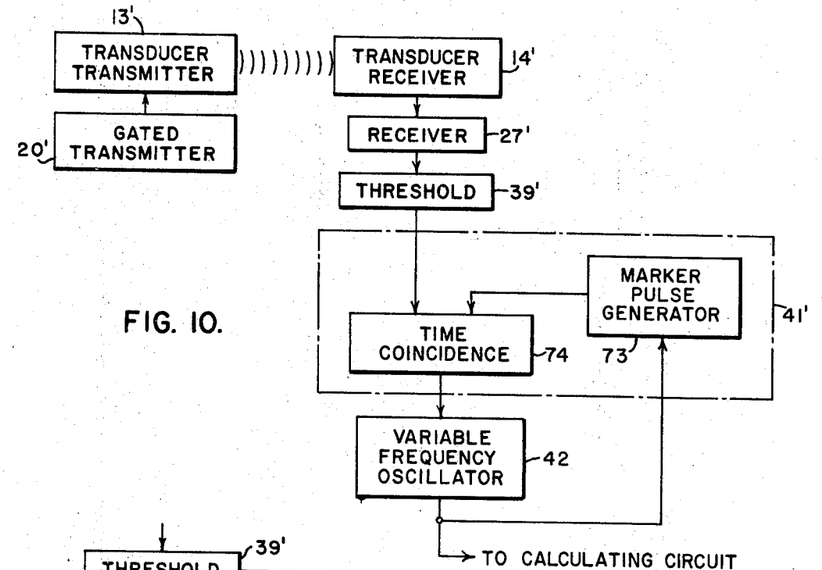
FIG. 10 illustrates a speed of sound correction circuit for the orientation of FIG. 8.

FIG. 10 illustrates an auxiliary circuit which corrects the frequency of the VFO 42. Components in FIG. 10 similar to those already described have been given like reference numerals. A simplified VFO control 41' includes a marker pulse generator 73 which is responsive to the output of the VFO 42 for providing a marker pulse after a certain count is attained. Basically, a nominally correct speed of sound is assumed, and knowing the frequency of the VFO 42, the marker pulse is provided when a count is reached corresponding to the time it would take the acoustic pulse to travel from the transmitting transducer 13' to the receiving transducer 14' separated by a known and fixed distance. If the assumed speed of sound is equal to the actual speed of sound, the marker pulse and the pulse from threshold circuit 39' arrive simultaneously at the time coincidence circuits 74, the simultaneous occurrence indicating that no correction need be made to the VFO frequency. If, however, the assumed speed of sound is not equal to the actual speed of sound or the actual speed of sound increases or decreases, the time occurrence of the pulse from threshold circuit 39' and the marker pulse from the generator 73 are not coincident and therefore a correction signal is provided to the VFO 42 to modify its frequency accordingly. The specific VFO control 41' forms no part of the present invention but merely serves to illustrate one type of control which may be utilized.

Figure 11:
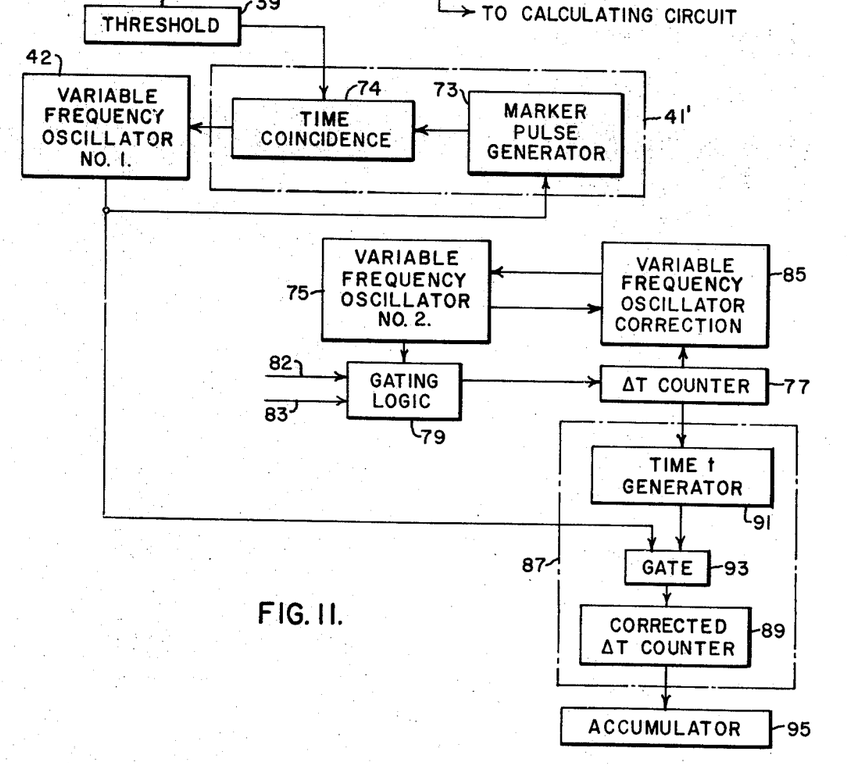
FIG. 11 illustrates an embodiment of the invention whereby average fluid velocity may be obtained.

For those applications where an output is desired that is proportional to the average velocity in the canal, an arrangement such as illustrated in FIG. 11 may be utilized. The arrangement of FIG. 11 makes use of two variable frequency oscillators 42 and 75. The VFO 42 provides an output signal, the frequency of which is proportional to the speed of sound in the fluid under measurement, and is governed by auxiliary means including the VFO control circuit 41' which may be similar to the one described with respect to FIG. 10. A second variable frequency oscillator 75 is provided for delivering its output signal to a primary digital counter in the form of ΔT counter 77, through the gating logic 79, for a period of time ΔT governed by receipt of signals on input leads 82 and 83 associated with the downstream and upstream received pulses respectively.

With each acoustic transmission, the distance $L_n$ between the moving transducers 13 and 14 progressively increases, however instantaneously from transmission to subsequent transmission, the distance $L_n$ increases by an infinitesimal amount. Utilizing this basic assumption, there is provided a VFO correction circuit 85 which may be identical to the aforementioned VFO correction arrangement 54 of FIG. 7. The final correction circuitry 87 includes a secondary digital counter 89, generator means 91 for generating a time interval $t$ dependent upon the count in the ΔT counter 77, and gating means 93 for gating the output from VFO 42 through to the counter 89 for the time period $t$. The average of the readings in the counter 89 may then be obtained by means of the V accumulator 95 which provides the average of all the readings obtained over the time interval in which all the readings were obtained. In essence, the corrected ΔT counter 89 functions as a storage medium for transfer of its count to the V accumulator 95 where a summation and a division may be performed in order to obtain an average. It is obvious that other storage arrangements may be utilized to perform this function and as such, the corrected ΔT counter may if desired be eliminated and the VFO 42 output signal be gated directly to a division and accumulator circuit.

The operation of FIG. 11 may best be described by a mathematical demonstration. The frequency of the VFO 42 is proportional to the speed of sound in the fluid, that is:

$$F_{\text{VFO}\#1} = K_1 C \tag{3}$$

The time it takes, $T_F$, for an acoustic signal to travel between the fixed transducers is dependent upon the distance $L_F$ between them, that is:

$$T_F = \frac{L_F}{C} \tag{4}$$

Since the marker pulse generator 73 counts up the VFO 42 output for a period of time $T_F$, the final count $N_1$ in the marker pulse generator at the end of time $T_F$, is:

$$N_1 = F_{VFO\#1} \times T_F \qquad (5)$$

From the above equations, it is seen that:

$$K_1 = \frac{N_1}{L_F} \qquad (6)$$

Similarly, $$F_{VFO\#2} = K_2 C \qquad (7)$$

for VFO 75 and it may be demonstrated that:

$$K_2 = \frac{N_2}{L_n} \qquad (8)$$

where $N_2$ is the count in the marker pulse generator located in the VFO correction circuit 85 and $L_n$ is the instantaneous distance between the moving transducers. Basically, the time $t$ generator 91 includes an adjustable stable crystal oscillator providing a chosen stable frequency F and by reference to the aforementioned application Ser. No. 569,996:

$$t = \beta \times \frac{1}{F} \qquad (9)$$

where $\beta$ is the count of the $\Delta T$ counter 77 and is equal to:

$$\beta = (\Delta T) \times F_{VFO\#2}$$

$$\beta = \frac{2LV}{C^2} \times K_2 C \qquad (10)$$

$$\beta = \frac{2K_2 L_n V}{C}$$

The count $\beta'$ in the secondary digital counter 89 is:

$$\beta' = F_{VFO}\#1 \times (t)$$

$$\beta' = F_{VFO}\#1 \times \left(\beta \times \frac{1}{F}\right)$$

$$\beta' = \frac{F_{VFO}\#1}{F} \frac{(2K_2 L_n V)}{C} \qquad (11)$$

Substituting from Equations 3, 6 and 8:

$$\beta' = \left[\frac{2N_1 N_2}{L_F F}\right] V \qquad (12)$$

and it is seen that the count in the secondary digital counter 89 is proportional to the velocity V by a proportionality factor, in brackets, containing all known terms.

Although the present invention has been described with a certain degree of particularity, it should be understood that the present disclosure has been made by way of example and that modifications and variations of the present invention are made possible in the light of the above teachings.

What is claimed is:

1. A system for obtaining flow measurements of a fluid in a fluid conveying conduit wherein the fluid flows in an upstream to downstream direction, comprising:
    (A) upstream and downstream transducer means;
    (B) drive means for moving said upstream and downstream transducer means along predetermined first and second respective paths between lower and upper limits in the fluid;
    (C) means for propagating acoustic energy along an acoustic path through the fluid towards said upstream transducer means, during the course of travel of said upstream transducer means, said upstream transducer means being operable to provide a corresponding output signal in response to receipt of said acoustic energy;
    (D) means for propagating acoustic energy along an acoustic path through the fluid towards said downstream transducer means, during the course of travel of said downstream transducer means, said downstream transducer means being operable to provide a corresponding output signal in response to receipt of said acoustic energy;
    (E) circuit means responsive to said output signals for deriving, during said course of travel, values dependent upon the difference in time travel, $\Delta T$, of said acoustic energy to the respective upstream and downstream transducer means; and
    (F) accumulator means for obtaining an output value indicative of the summation of said values derived during said course of travel of said upstream and downstream transducer means.

2. Apparatus according to claim 1 wherein:
    (A) the means for propagating acoustic energy toward the upstream transducer means is the downstream transducer means and the means for propagating acoustic energy toward the downstream transducer means is the upstream transducer means; and wherein
    (B) the acoustic path between the upstream and downstream transducer means is at a constant angle $\theta$, with respect to fluid flow direction, during the course of travel of the transducer means.

3. Apparatus according to claim 1 wherein:
    (A) the upstream and downstream transducer means travel along wall portions of the conduit in a manner that the acoustic path traverses a cross section of the fluid within said conduit.

4. Apparatus according to claim 3 which includes:
    (A) first and second tracks associated with the said wall portions of the conduit for governing the movement of the upstream and downstream transducer means respectively.

5. Apparatus according to claim 1 wherein:
    (A) the drive means moves the upstream and downstream transducer means at a constant rate, along the first and second respective paths.

6. The apparatus according to claim 1 wherein:
    (A) acoustic energy propagation takes place in repetitive transmission cycles; and wherein
    (B) means are provided for obtaining a final output which is indicative of the summation of the values derived, modified by a factor related to the rate of movement of the transducer means and the rate of acoustic energy propagation.

7. The apparatus according to claim 6 wherein:
    (A) means are provided for further modifying the summation by a factor related to the total travel time of said transducer means to obtain a final summation.

8. The apparatus according to claim 2 wherein:
    (A) acoustic energy propagation takes place in repetitive transmission cycles, and wherein
    (B) the circuit means is digital in nature and includes:
        (1) a variable frequency oscillator, and
        (2) counter means for counting up the variable frequency output signal for a period of time governed by the receipt of the acoustic energy at the respective downstream and upstream transducer means; the system additionally including
    (C) means for adjusting the frequency of said variable frequency oscillator to correct for variations in the speed of sound in the fluid under measurement.

9. The apparatus according to claim 8 wherein the means for adjusting the frequency of the variable frequency oscillator is:
    (A) an auxiliary system including:
        (1) a pair of stationary transducers for propagation of acoustic energy through the fluid under measurement,
        (2) circuit means responsive to the variable frequency oscillator output and to receipt of projected acoustic energy between said stationary transducers for governing the variable frequency oscillator frequency.

10. The apparatus according to claim 9 wherein:

(A) the acoustic path between the stationary transducers is at right angles to the acoustic path between the upstream and downstream transducers.

11. The apparatus according to claim 9 wherein:
(A) the acoustic path between the stationary transducers is at right angles to the direction of fluid flow.

12. Apparatus for obtaining average velocity of a fluid in a non-rectangular cross-sectional fluid conveying conduit, comprising:
(A) upstream and downstream transducer means;
(B) drive means for moving said upstream and downstream transducer means along predetermined first and second respective paths between lower and upper limits in the fluid;
(C) means for propagating acoustic energy along an acoustic path through the fluid towards said upstream transducer means, during the course of travel of said upstream transducer means, said upstream transducer means being operable to provide a corresponding output signal in response to receipt of said acoustic energy;
(D) means for propagating acoustic energy along an acoustic path through the fluid towards said downstream transducer means, during the course of travel of said downstream transducer means, said downstream transducer means being operable to provide a corresponding output signal in response to receipt of said acoustic energy;
(E) a first variable frequency oscillator, the output frequency of which is proportional to the speed of sound in the fluid under measurement;
(F) auxiliary means for correcting the frequency of said first variable frequency oscillator in accordance with variations of the speed of sound in the fluid;
(G) a second variable frequency oscillator;
(H) a primary digital counter for counting up, during said transmission cycles, the output of said second variable frequency oscillator for a period of time governed by the respective receipt of acoustic energy signals at said upstream and downstream transducer means;
(I) correction means responsive to the output signal of said second variable frequency oscillator and the count in said primary digital counter for controlling the frequency of said second variable frequency oscillator;
(J) storage means;
(K) means for generating a time interval $t$ dependent upon the count in said primary digital counter, during a transmission cycle;
(L) gating means for gating the output signal of said first variable frequency oscillator to said storage means for said time interval $t$; and
(M) means for obtaining the average count in said storage means over a predetermined time period.

13. A method of fluid flow measurement for a fluid flowing in an upstream to downstream direction within a fluid conveying conduit comprising the steps of:
(A) projecting acoustic energy through the fluid from an upstream transducer means to a downstream transducer means and from a downstream transducer means to an upstream transducer means;
(B) deriving values dependent upon the difference in time arrival, $\Delta T$, of said acoustic energy at the respective first and second transducer means;
(C) moving said first and second transducer means along first and second respective paths between lower and upper limits in the fluid.
(D) repeating steps (A) and (B) during the course of travel of said upstream and downstream transducer means until respective path limits are reached;
(E) deriving an indication of the summation of said values derived during the course of travel of said upstream and downstream transducer means.

References Cited

UNITED STATES PATENTS

| | | | |
|---|---|---|---|
| 3,008,332 | 11/1961 | Charbonnier et al. | 73—290X |
| 3,329,017 | 7/1967 | Yamamoto et al. | 73—194 |
| 3,336,801 | 8/1967 | Snavely | 73—194X |

CHARLES A. RUEHL, Primary Examiner